US012800060B2

(12) United States Patent
Hodge et al.

(10) Patent No.: US 12,800,060 B2

(45) Date of Patent: Nov. 17, 2026

(54) DEVICES AND METHODS FOR MAINTAINING RELIEF VALVES IN OPEN POSITIONS

(71) Applicant: EOG Resources, Inc., Houston, TX (US)

(72) Inventors: Chad Michael Hodge, Lovington, NM (US); Casey Rodriguez, Lovington, NM (US); Darell Eric Pitts, Lovington, NM (US); Sylvester Zarate, Lovington, NM (US)

(73) Assignee: EOG RESOURCES, INC., Houston, TX (US)

( * ) Notice: Subject to any disclaimer, the term of this patent is extended or adjusted under 35 U.S.C. 154(b) by 0 days.

(21) Appl. No.: 19/074,154

(22) Filed: Mar. 7, 2025

(65) Prior Publication Data

US 2025/0283555 A1 Sep. 11, 2025

Related U.S. Application Data

(60) Provisional application No. 63/562,355, filed on Mar. 7, 2024.

(51) Int. Cl.
*F16K 35/10* (2006.01)
*B65D 90/62* (2006.01)
*F16K 27/12* (2006.01)

(52) U.S. Cl.
CPC ............ *F16K 35/10* (2013.01); *B65D 90/623* (2013.01); *F16K 27/12* (2013.01)

(58) Field of Classification Search
CPC ........ F16K 35/10; F16K 27/12; B65D 90/623
See application file for complete search history.

(56) References Cited

U.S. PATENT DOCUMENTS 5,842,681 A * 12/1998 Sisk .................... B65D 90/623 251/114
9,666,988 B2 5/2017 Gates et al.
10,443,301 B2 10/2019 Bartha et al.
(Continued)

FOREIGN PATENT DOCUMENTS

CA 2854032 A1 12/2015
CN 205262780 U 5/2016

OTHER PUBLICATIONS

PCT/US2025/019037 International Search Report and Written Opinion dated Jun. 11, 2025 (13 p.).

*Primary Examiner* — Kelsey E Cary
(74) *Attorney, Agent, or Firm* — CONLEY ROSE, P.C.

(57) ABSTRACT

A relief valve has a closed position with a lid of the relief valve closing an opening of a storage tank and an open position with the lid pivoted away from the opening of the storage tank. A hand saver device for maintaining the relief valve in the open position includes a body comprising a U-shaped base plate having a central axis, a first end, a second end opposite the first end, a pair of lateral sides extending axially from the first end to the second end, and a recess extending axially from the first end. In addition, the hand saver device includes a pair of laterally spaced extension arms extending upwardly from the base plate. Each extension arm includes a throughbore extending laterally therethrough. Further, the hand saver device includes an elongate locking rod configured to be removably and slidably disposed in the throughbores of the extension arms.

14 Claims, 6 Drawing Sheets

(56) References Cited

U.S. PATENT DOCUMENTS

| | | | | |
|---|---|---|---|---|
| 10,983,025 | B2 | 4/2021 | Durant et al. | |
| 11,352,203 | B2 | 6/2022 | Anderson | |
| 2004/0226611 | A1* | 11/2004 | Berger | F16K 35/10 137/385 |
| 2017/0226600 | A1* | 8/2017 | Gill | F16K 1/2007 |
| 2020/0011445 | A1* | 1/2020 | Sands, III | F16K 31/0682 |

* cited by examiner

DEVICES AND METHODS FOR MAINTAINING RELIEF VALVES IN OPEN POSITIONS

CROSS-REFERENCE TO RELATED APPLICATIONS

This application claims benefit of U.S. provisional patent application Ser. No. 63/562,355 filed Mar. 7, 2024, and entitled "Devices and Methods for Maintaining Relief Valves in Open Positions," which is hereby incorporated herein by reference in its entirety for all purposes.

STATEMENT REGARDING FEDERALLY SPONSORED RESEARCH OR DEVELOPMENT

Not applicable.

BACKGROUND

The disclosure relates generally to relief valves. More particularly, the disclosure relates to devices and methods for maintaining emergency pressure relief valves open during inspections, maintenance, repair, or combinations thereof.

Pressure vessel systems typically include a pressure vessel defining an internal cavity in which materials such as fluids (e.g., hydrocarbon fluids) may be stored for a desired period of time. Pressure vessels typically have a designed maximum internal pressure that may not be exceeded without potentially jeopardizing the operability (e.g., the structural integrity) of the pressure vessel. To ensure the fluid pressure within internal cavity of the pressure vessel remains below this maximum operating pressure, pressure vessel systems often include a specialized pressure relief valve sometimes referred to as an emergency pressure relief valve (EPRV). Typically, an EPRV of a storage system includes a cover or lid that may be pivoted between a closed position blocking and sealing an opening in the pressure vessel to prevent fluid communication between the internal cavity of the pressure vessel and the surrounding environment, and an open position spaced apart from the opening in the pressure vessel to permit fluid communication between the internal cavity of the pressure vessel and the external environment. The lid is biased to the closed position, but is configured to transition to the open position in response to fluid pressure within the internal cavity of the pressure vessel exceeding the maximum operational pressure of the pressure vessel, thereby preventing the fluid pressure within the internal cavity of the pressure vessel from exceeding the maximum operational pressure of the pressure vessel.

BRIEF SUMMARY OF THE DISCLOSURE

Embodiments of devices for maintaining a relief valve in an open position are disclosed herein. The relief valve has a closed position with a lid of the relief valve closing an opening of a storage tank and the open position with the lid pivoted away from the opening of the storage tank. In one embodiment, a hand saver device for maintaining a relief valve in an open position comprises a body comprising a U-shaped base plate having a central axis, a first end, a second end opposite the first end, a pair of lateral sides extending axially from the first end to the second end, and a recess extending axially from the first end. In addition, the hand saver device comprises a pair of laterally spaced extension arms extending upwardly from the base plate.

Each extension arm includes a throughbore extending laterally therethrough. Further, the hand saver device comprises an elongate locking rod configured to be removably and slidably disposed in the throughbores of the extension arms.

Embodiments of methods for maintaining a relief valve in an open position are also disclosed herein. The relief valve includes a pivot arm having a first end and a second end, a weight attached to the pivot arm proximal the first end, and a lid coupled to the pivot arm proximal the first end. In one embodiment, a method for maintaining a relief valve coupled to a storage tank in an open position comprises (a) coupling a hand saver device to the relief valve with the relief valve in a closed position. The hand saver device comprises a body comprising a base plate and a pair of extension arms extending upwardly from the base plate. The base plate has a central axis, a first end, a second end opposite the first end, a pair of lateral sides extending axially from the first end to the second end, and a recess extending axially from the first end. The extension arms are disposed on opposite lateral sides of the recess. Each extension arm includes a throughbore. The hand saver device also comprises an elongate locking rod configured to be removably disposed in the throughbores of the extension arms. In addition, the method comprises (b) raising the lid to transition the relief valve from the closed position to the open position and move the second end of the pivot arm downward through the recess of the base plate after (a). Further, the method comprises (c) advancing a locking rod through the throughbores of the extension arms after (b) to prevent the second end of the pivot arm from rotating upward through the recess.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION OF THE PREFERRED EMBODIMENTS

Figure 1:
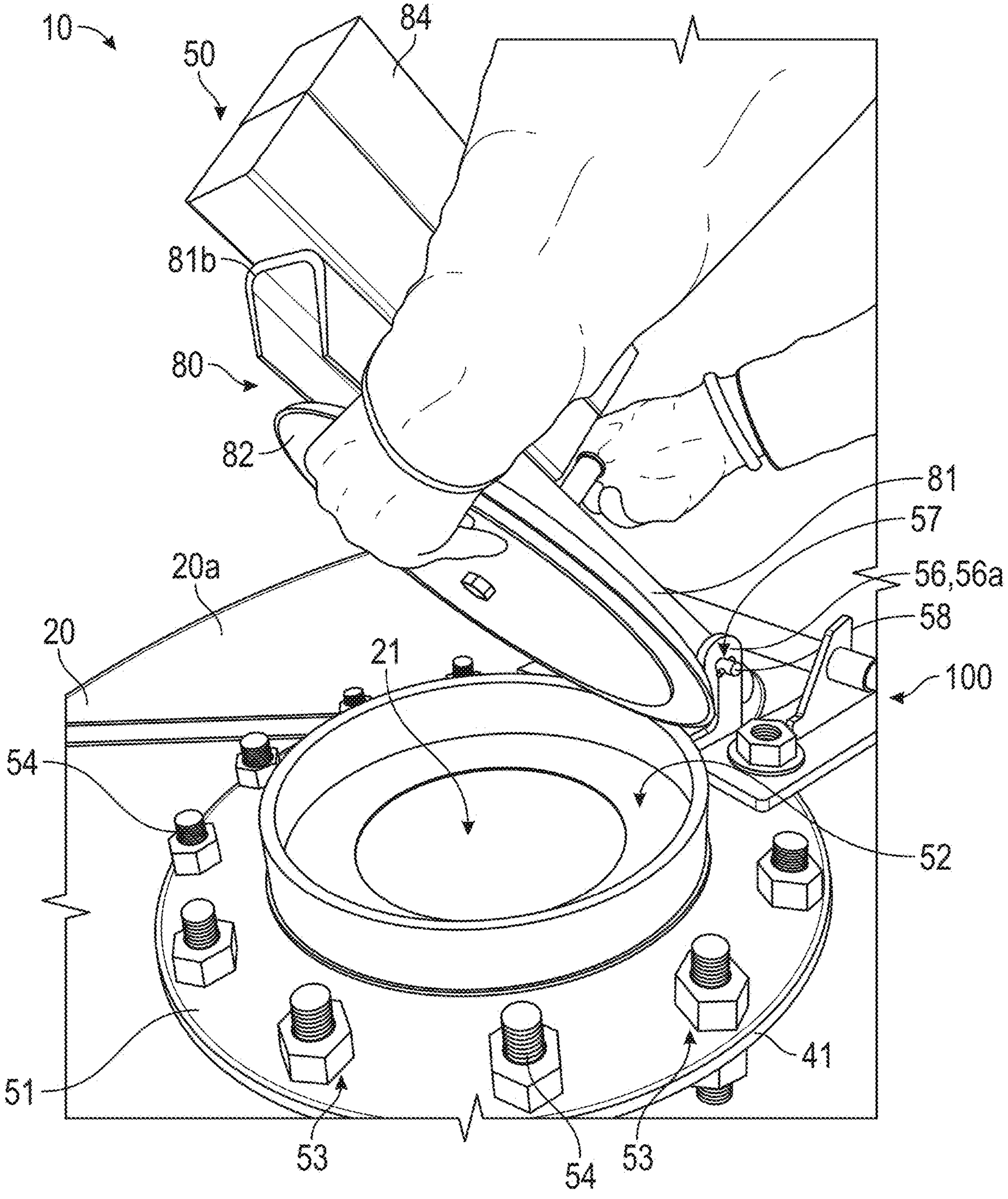
FIG. 1 is a partial perspective view of an embodiment of a fluid storage vessel in accordance with principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct engagement between the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As described above, pressure vessel systems often include an emergency pressure relief valve (EPRV) coupled therewith for managing the internal fluid pressure of the pressure vessel to ensure the internal fluid pressure does not exceed a maximum operating pressure of the pressure vessel. In particular, the EPRV includes a cover or lid configured to move between a closed position blocking and sealing an opening in the pressure vessel to prevent fluid communication between the internal cavity of the pressure vessel and the outside environment, and an open position spaced apart from the opening in the pressure vessel to allow fluid communication between the internal cavity of the pressure vessel and the outside environment. Often, the cover is biased to the closed position with relatively heavy weights (e.g., 100 lbs.). In some cases, the cover of the EPRV and associated opening in the pressure vessel are relatively large, and thus, may be used by field personnel to access the internal cavity of the storage vessel for inspection, maintenance, and/or repairs. In cases where the cover of the EPRV is biased to the closed position by heavy weights, the weights and cover must be raised and lowered multiple times or the weights and cover must be disassembled and removed to access the opening and inside of the pressure vessel. The former approach (raising and lowering the cover and weights) is physically demanding and may present safety risks in the event the cover and weights are inadvertently dropped or slam shut, and the latter approach (disassembly and removing the weights and cover) are physically demanding and time consuming. Accordingly, embodiments described herein are directed to devices and methods for safely maintaining the cover of a pressure relief valve (e.g., EPRV) in an open position during inspection, maintenance, and/or repair operations in connection with the associated pressure vessel.

Figure 2:
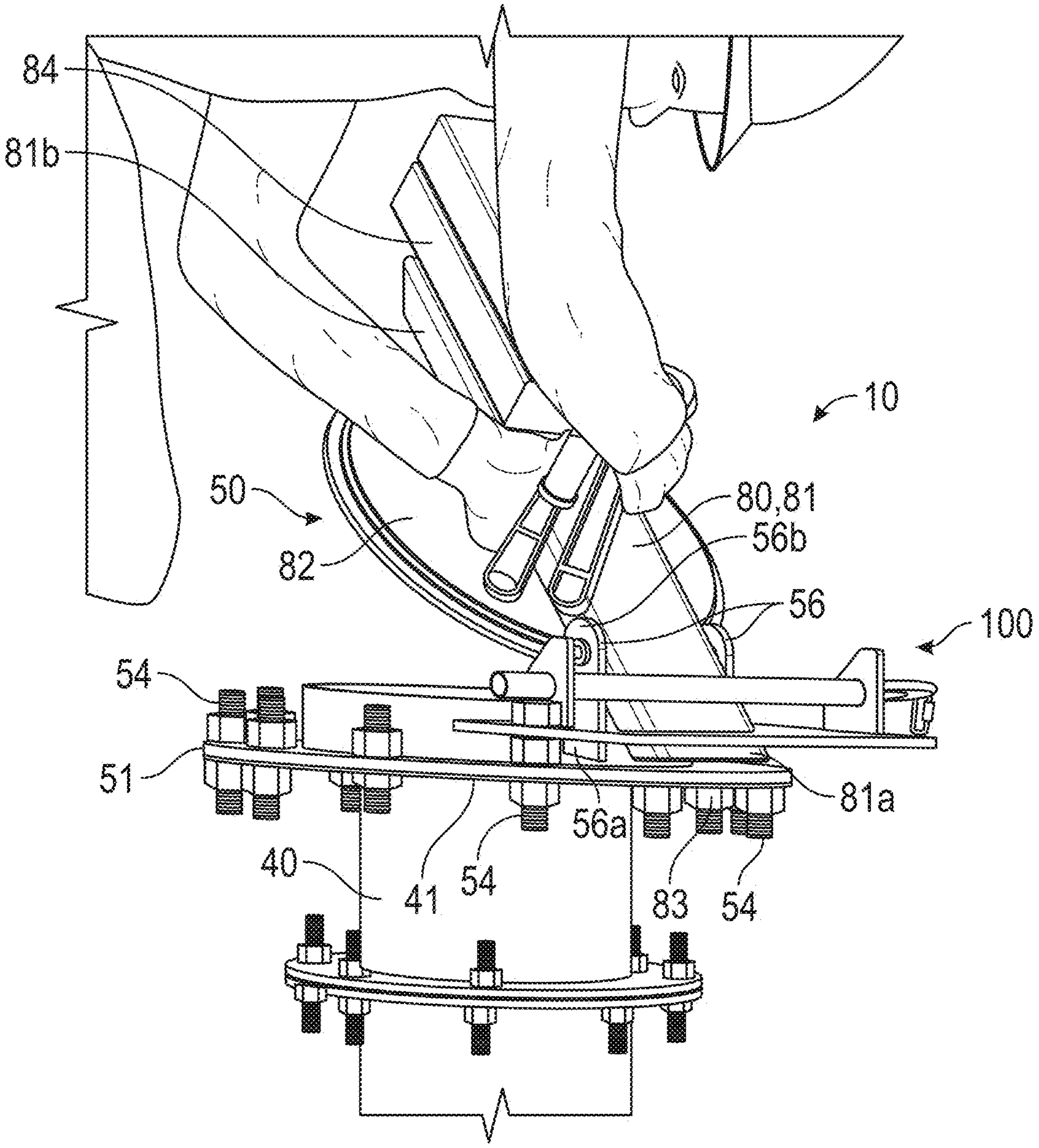
FIG. 2 is an enlarged, partial perspective side view of the fluid storage vessel of FIG. 1 illustrating the pressure relief valve.

Referring now to FIGS. 1 and 2, an embodiment of a fluid storage vessel 10 in accordance with principles disclosed herein is shown. In this embodiment, fluid storage vessel 10 generally includes a storage tank 20 and a pressure relief valve (e.g., EPRV) 50 coupled to the storage tank 20. Storage tank 20 has a lower or bottom end situated on or proximal the ground (not shown) and an upper or top end **20*a* shown in FIG. 1. In addition, storage tank 20 has an inner cavity (not shown) in which one or more fluids (e.g., hydrocarbon fluids) are contained and stored and an opening 21 in top end 20*a*. A fluid conduit 40 that extends from top end 20*a* and is in fluid communication with opening 21 and the inner cavity of storage tank 20. The upper end of conduit 40 includes an annular tank flange 41. A plurality of circumferentially-spaced holes extend through tank flange 41. Conduit 40 and opening 21 provide access to the internal cavity of storage tank 20. Although storage tank 20 is generally described as being vertically oriented, it may be understood that the configuration of storage tank 20 may vary in other embodiments from that shown in FIGS. 1 and 2**.

Pressure relief valve 50 is coupled to storage vessel 10 via tank flange 41 and provides controlled, selective access to and fluid communication between the internal cavity of storage tank 20 and the external environment. Pressure relief valve 50 includes an annular attachment flange or plate 51 fixably secured to mating tank flange 41 and a valve member 80 pivotably coupled to attachment plate 51. Attachment plate 51 includes a central opening 52 and a plurality of uniformly circumferentially-spaced holes 53 disposed about central opening 52. Each hole 53 is aligned with a corresponding hole in tank flange 41. A bolt 54 extends through the aligned holes in the tank flange 41 and attachment plate 51, and nuts are threaded onto bolts 54 (above and below flange 41 and plate 51) to secure attachment plate 51 to tank flange 41, and sealingly compress attachment plate 51 against tank flange 41, thereby coupling pressure relief valve 50 to the tank flange 41.

In this embodiment, a pair of laterally spaced, parallel anchoring projections or braces 56 extend vertically upward from attachment plate 51. In particular, each brace 56 has a lower end **56*a* fixably secured to plate 51** and an upper end

56*b* opposite lower end 56*a* and distal plate 51. Each anchoring brace 56 includes a throughbore 57 proximal upper end 56*b* for slibably and rotatably receiving a pivot pin 58.

Referring still to FIGS. 1 and 2, valve member 80 includes an elongate pivot arm 81 pivotally coupled to attachment plate 51, a cover or lid 82 fixably attached to arm 81, and a heavy weight 84 coupled to arm 81. Lid 82 is configured to be selectively moved between an open position spaced apart from attachment plate 51 and a closed position sealingly engaging attachment plate 51. In the closed position, lid 82 closes, blocks, and seals central opening 52 in attachment plate 51, thereby preventing fluid communication between the internal cavity of storage tank 20 and the outside environment via opening 52 and fluid conduit 40. However, in the open position, lid 82 is spaced apart from attachment plate 51, thereby allowing fluid communication between the internal cavity of storage tank 20 and the outside environment via opening 52 and fluid conduit 40.

Heavy weight 84 biases cover 82 to the closed position. In particular, pivot arm 81 has a first end 81*a* and a second end 81*b* opposite end 81*a*. A throughbore extends horizontally through pivot arm 81 proximal end 81*a*. Pivot arm 81 is positioned between braces 56 with the throughbore in pivot arm 81 coaxially aligned with throughbores 57 in braces 56, and pivot pin 58 extends through the throughbore in pivot arm 81 and throughbores 57 in braces 56, thereby pivotally coupling pivot arm 81 to attachment plate 51. In this embodiment, the throughbore in pivot arm 81 and throughbores 57 in braces 56 are positioned and oriented such that pivot pin 58 extends horizontally therethrough (i.e., pivot pin 58 is horizontally oriented). Cover 82 is attached to pivot arm 81 proximal end 81*b* and heavy weight 84 is attached to pivot arm 81 above cover 82 proximal end 81*b*. As a result, heavy weight 84 biases cover 82 downward to the closed position (via gravity) as pivot arm 81 is free to pivot relative to attachment plate 51 about pin 58.

As previously described, cover 82 has an open position and a closed position, and is biased to the closed position by heavy weight 84. Cover 82 is part of valve member 80 of pressure relief valve 50, and thus, valve member 80 and pressure relief valve 50 may also each be described as having an open position with cover 82 spaced apart from attachment plate 51 and a closed position with cover 82 sealingly engaging attachment plate 51.

As described above, cover 82 (and hence valve member 80 and pressure relief valve 50) are normally biased to the closed position by heavy weight 84. In the closed position, relief valve 50 restricts and/or prevents fluid communication between the internal cavity of storage tank 20 and the external environment surrounding storage tank 20, such that the internal cavity is sealed from the external environment. Conversely, in the open position, relief valve 50 permits fluid communication between the internal cavity of storage tank 20 and the external environment surrounding the storage tank 20 such that fluid may flow between the internal cavity of storage tank 20 and the external environment. However, valve member 80, and hence valve member 80 and pressure relief valve 50, transition or actuate from the closed position to the open position in response to fluid pressure within the internal cavity of storage tank 20 reaching a predefined threshold pressure that exceeds the biasing force provided the heavy weight 84, such as a maximum operating pressure of the storage tank 20 that is based on the configuration and design of the storage tank 20. For example, fluid vapor may collect within the internal cavity of storage tank 20 and increase in pressure within storage tank 20 until the fluid pressure within the internal cavity within storage tank 20 reaches the threshold pressure. Upon reaching the threshold pressure, the fluid pressure in the internal cavity of storage tank 20 exceeds the biasing force exerted by the heavy weight 84, thereby urging cover 82 upward and lifting cover 82 from attachment plate 51 to transition cover 82 to the open position and allow relief of the excess fluid pressure within the internal cavity of storage tank 20. Once sufficient fluid pressure within the internal cavity of storage tank 20 is relieved, the biasing force applied by heavy weight 84 exceeds the fluid pressure in the internal cavity of storage tank 20, thereby urging cover 82 downward to the closed position.

As previously described, heavy weight 84 biases cover 82 and valve member 80 to the closed position. To access the internal cavity of storage tank 20 for inspection, maintenance, repair, or combinations thereof, cover 82 and valve member 80 must be moved to the open position. This can be achieved by removing heavy weight 84, or manually lifting cover 82 and heavy weight 84, and then holding cover 82 and heavy weight 84 in a position sufficiently spaced above attachment plate 51 to allow access to the internal cavity of storage tank 20. Removing heavy weight 84 from pivot arm 81 (and then reattaching heavy weight to pivot arm 81 after the inspection, maintenance, and/or repair) is time consuming; and manually lifting and holding cover 82 and heavy weight 84 is hazardous and potentially dangerous. Accordingly, embodiments described herein are directed to devices, which may be referred to herein as "hand saver" devices, for safely maintaining a pressure relief valve (e.g., pressure relief valve 50) in an open position during the inspection, maintenance, and/or repair of storage tank 20.

Figure 3:
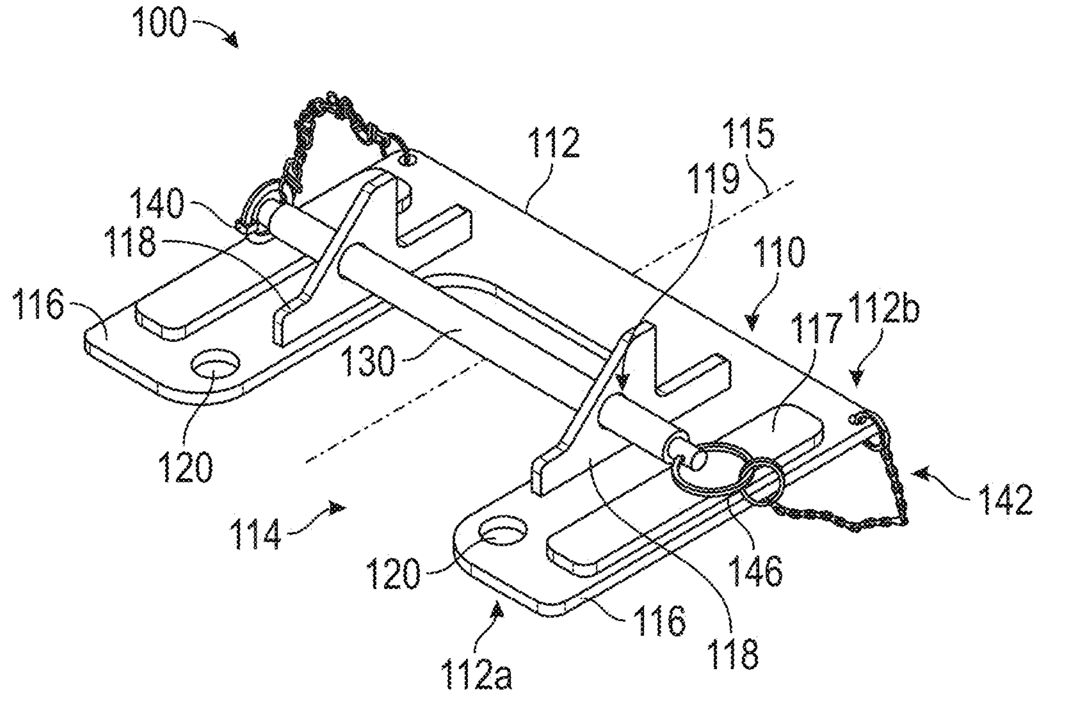
FIG. 3 is a perspective view of the hand saver device of FIG. 1.
Figure 4:
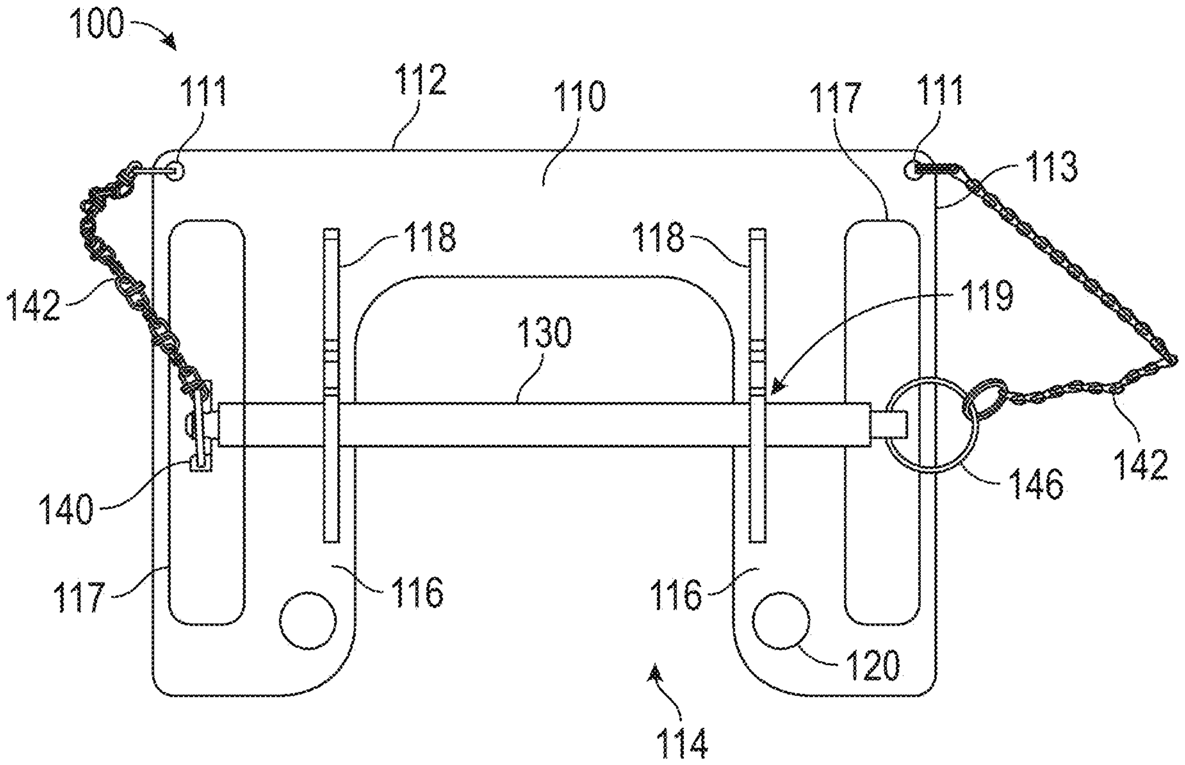
FIG. 4 is a top view of the hand saver device of FIG. 3.

Referring now to FIGS. 3 and 4, an embodiment of a hand saver device 100 for safely maintaining cover 82, and hence valve member 80 and pressure relief valve 50, in an open position is shown. In this embodiment, hand saver device 100 includes a body 110 and an elongate locking rod 130 removably coupled to body 110. In this embodiment, one or more fasteners, for example, a locking pin 140 is removably coupled to locking rod 130 to prevent locking rod 130 from inadvertently decoupling from body 110.

Figure 5:
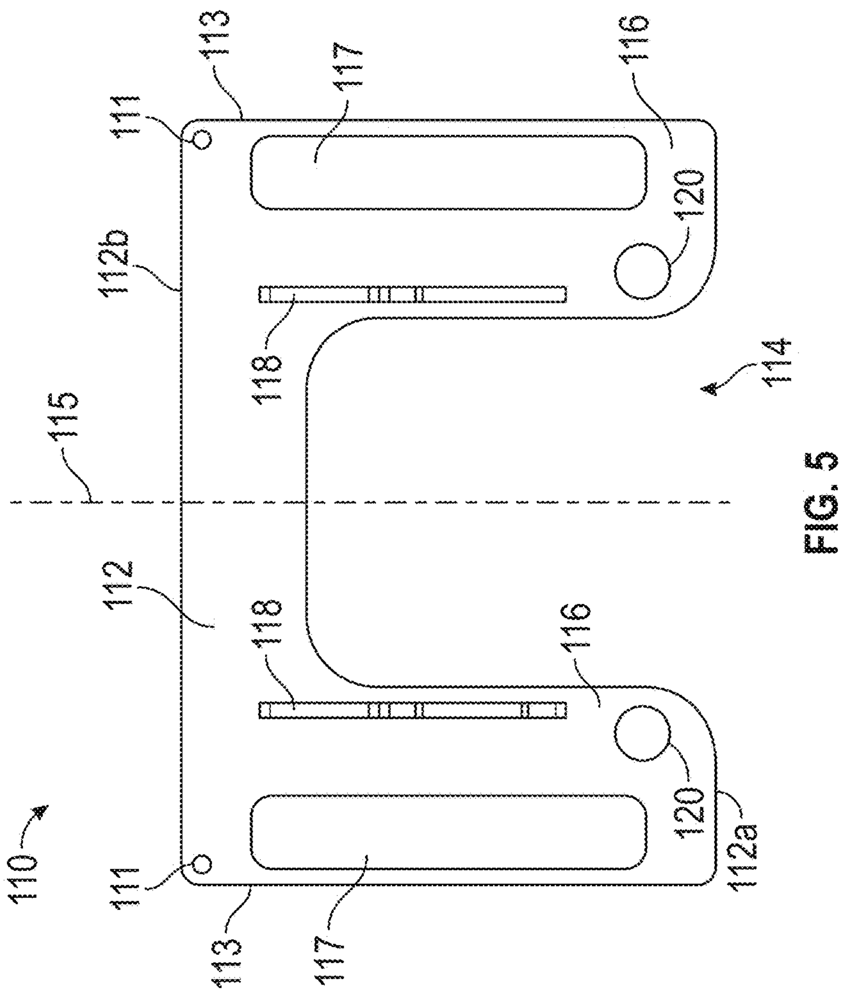
FIG. 5 is a top view of the body of the hand saver device of FIG. 3.
Figure 6:
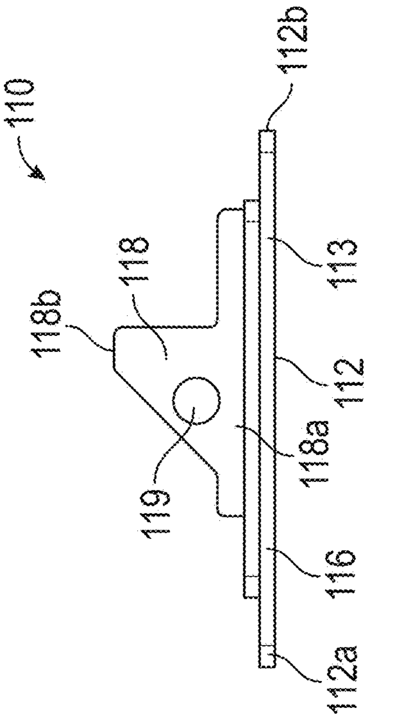
FIG. 6 is a side view of the body of the hand saver device of FIG. 3.
Figure 7:
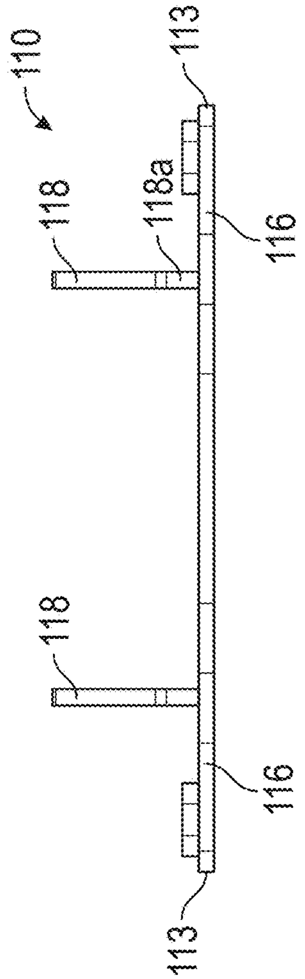
FIG. 7 is a front view of the body of the hand saver device of FIG. 3.
Figure 8:
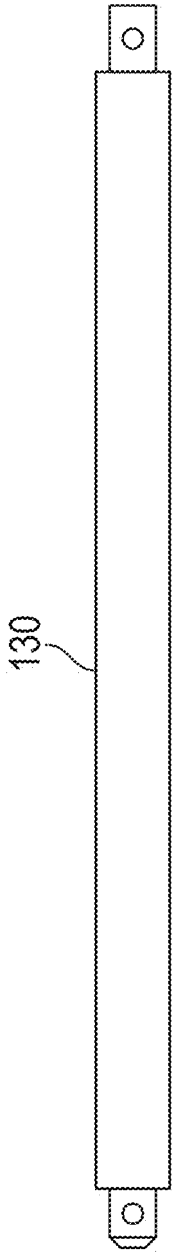
FIG. 8 is a front view of the locking rod of the hand saver device of FIG. 3.
Figure 9:
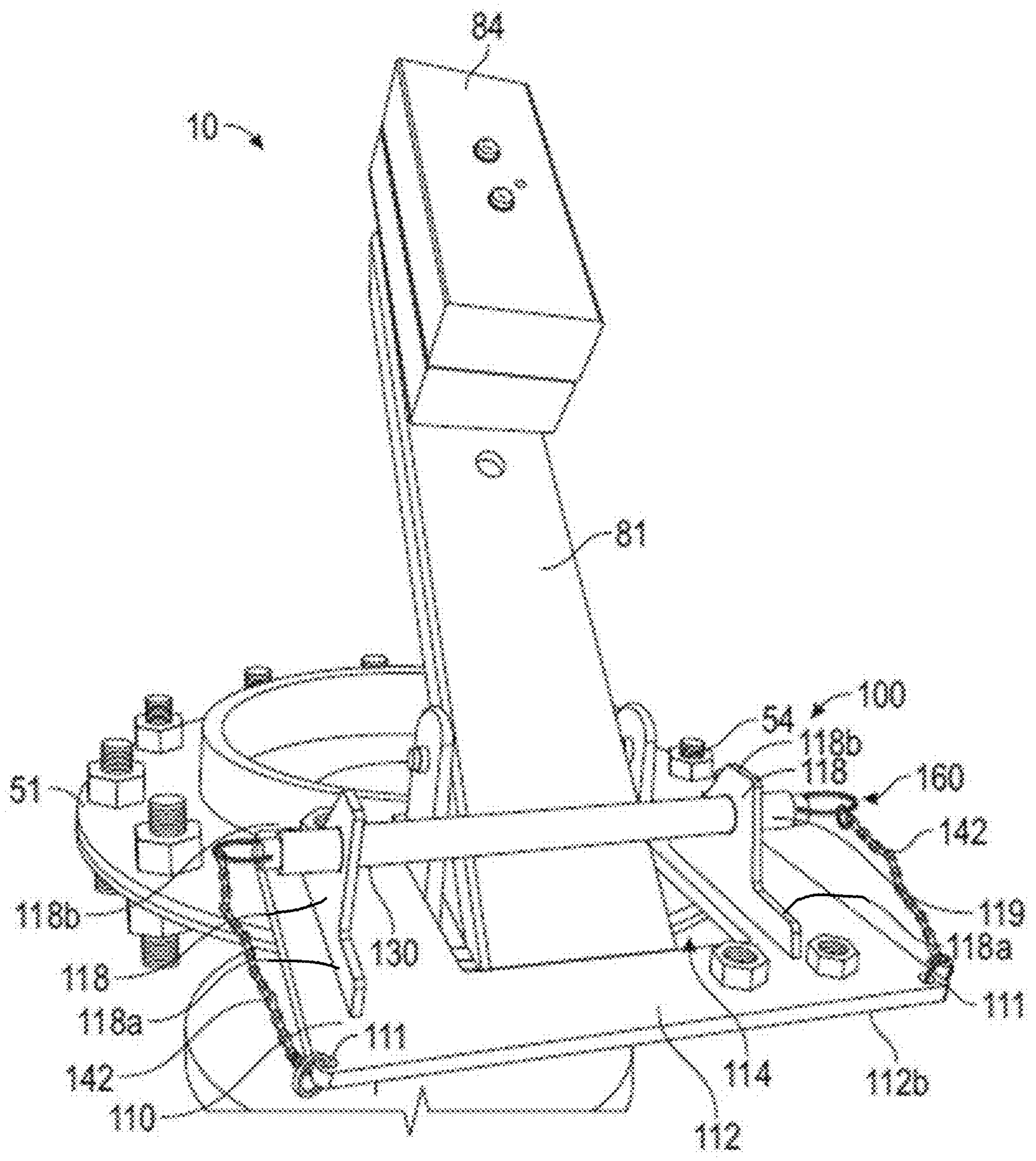
FIG. 9 is a perspective view of the hand saver device of FIG. 3 coupled to the pressure relief valve of the fluid storage vessel of FIG. 1.

Referring now to FIGS. 3-7, in this embodiment, body 110 includes a generally U-shaped base plate 112 and a pair of parallel, laterally spaced extension arms or plates 118 extending upwardly and perpendicularly from base plate 112. More specifically, as best shown in FIGS. 5-7, base plate 112 is a generally rigid plate having a central axis 115, a first end 112*a*, a second end 112*b* opposite end 112*a*, a pair of lateral sides 113 extending axially between ends 112*a*, 112*b*, and a recess 114 extending axially (relative to central axis 115) from first end 112*a* toward but not to second end 112*b*. In some embodiments, base plate 112 includes a pair of openings 111 proximal end 112*b* and lateral sides 113 for connecting a pair of chains or pull cords 142 to base plate 112. As best shown in FIGS. 3 and 4, each pull cord 142 has one end coupled to base plate 112 via a corresponding opening 111 and an opposite end removably coupled to an end of locking rod 130 via a split ring 146 (removably disposed through one end of locking rod 130) or locking pin 140 (removably attached to the opposite end of locking rod 130).

Referring again to FIGS. 5-7, recess 114 is laterally centered (relative to central axis 115) along end 112*a*, and may be described as defining a pair of elongate, parallel, plate-shaped members 116 extending axially (relative to central axis 115) from end 112*a* on opposite lateral sides of recess 114. Each elongate plate-shaped member 116 includes a throughbore or hole 120 proximal end 112*a* for securing hand saver device 100 to attachment plate 51 of pressure relief valve 50. In some embodiments, elongate plate-shaped members 116 may also include a pair of parallel reinforcement, support plates 117 coupled thereto on opposite lateral sides of recess 114.

Extension arms 118 extend perpendicularly from the upper surface of base plate 112, and in particular, from elongate plate-shaped members 116. Arms 118 are generally oriented vertically and parallel to central axis 115, and are disposed on opposite sides of recess 114. Each extension arm 118 may be described as having a first or fixed end 118*a* fixably secured to base plate 112 and a second or free end 118*b* distal base plate 112. Each extension arm 118 includes a throughbore or hole 119 extending therethrough between ends 118*a*, 118*b*. Holes 119 are coaxially aligned and sized to slidably receive locking rod 130 as shown in FIGS. 3 and 4.

As described above, the hand saver device 100 is used to safely maintain the pressure relief valve 50 in an open position during inspections, maintenance, repair, or combinations thereof. In particular and as best shown in FIG. 4, hand saver device 100 is removably coupled to attachment plate 51 by horizontally orienting base plate 112 with extension arms 118 extending vertically upward, positioning pivot arm 81 and braces 56 in recess 114 between with elongate plate-shaped members 116 (i.e., with plate-shaped members 116 disposed on opposite lateral sides of pivot arm 81 and braces 56), and holes 120 coaxially aligned with corresponding holes 53 in attachment plate 51. Next, base plate 112 is bolted to attachment plate 51 via bolts 54 that are passed through aligned holes 53, 120 to fixably secure base plate 112 to attachment plate 51. Next, cover 82 is lifted to transition cover 82, valve member 80, and relief valve 50 to the open positions. As cover 82 is raised, end 81*a* of pivot arm 80 rotates downward within recess 114 generally below holes 119 of extension arms 118. With end 81*a* positioned vertically below holes 119, locking rod 130 is advanced through aligned holes 119, and then secured within holes 119 via locking pin 140 and split ring 146, which are disposed through holes in opposite ends of locking rod 130, to prevent locking rod 130 from being inadvertently pulled or removed from holes 119. Next, cover 82 is carefully lowered until end 81*a* of pivot arm 80 directly engages and bears against locking rod 130, thereby preventing cover 82 from dropping further and transitioning to the closed position.

In this manner, the hand saver device 100 is connected to the pressure relief valve 50 with cover 82 and relief valve 50 in the open position to safely allow access to the internal cavity of tank vessel 20 for inspection, maintenance, repair, or combinations thereof. As described, heavy weight 84 does not need to be removed, and further, relief valve 50 does not need to be removed, thereby facilitating a safe and more efficient manner of maintaining cover 82 and relief valve 50 in an open position. After the inspection, maintenance, and/or repair, hand saver device 100 may be disengaged from the pressure relief valve 50 by generally performing the installation process in reverse.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A hand saver device for maintaining a relief valve in an open position, the relief valve having a closed position with a lid of the relief valve closing an opening of a storage tank and the open position with the lid pivoted away from the opening of the storage tank, the hand saver device comprising:

a body comprising a U-shaped base plate having a central axis, a first end, a second end opposite the first end, a pair of lateral sides extending axially from the first end to the second end, and a recess extending axially from the first end:

a pair of laterally spaced extension arms extending upwardly from the base plate, wherein each extension arm includes a throughbore extending laterally therethrough; and an elongate locking rod configured to be removably and slidably disposed in the throughbores of the extension arms;

wherein the recess is configured to at least partially receive a pivot arm of the relief valve coupled to the lid when the relief valve is in the open position.

2. The device of claim 1, further comprising a locking pin configured to be removably disposed in a hole extending through the locking rod to prevent the locking rod from decoupling from the extension arms.

3. The device of claim 1, wherein the base plate includes a pair of elongate, parallel, plate-shaped members disposed on opposite sides of the recess.

4. The device of claim 3, wherein the base plate includes a first throughbore extending through one of the plate-shaped members proximal the first end of the base plate and a second throughbore extending through the other of the plate-shaped members proximal the first end of the base plate, wherein each throughbore of the base plate is configured to receive a fastener to fixably couple the base plate to the storage tank.

5. The device of claim 1, wherein the locking rod is configured to engage the pivot arm of the relief valve.

6. A fluid storage vessel, comprising:

a storage tank having an internal cavity configured to store one or more fluids;

a pressure relief valve coupled to the storage tank and having an open position and a closed position, wherein the pressure relief valve comprises:

an annular attachment plate fixably secured to the storage tank, wherein the attachment plate includes an opening in fluid communication with the internal cavity of the storage tank;

a valve member including a pivot arm pivotally coupled to the attachment plate and a cover fixably attached to the pivot arm, wherein the cover engages the attachment plate and closes the opening of the attachment plate with the pressure relief valve in the closed position, and wherein the cover is spaced apart from the attachment plate and opens the opening of the attachment plate with the pressure relief valve in the open position; and the hand saver device of claim 1, wherein the base plate of the body is removably coupled to the attachment plate of the pressure relief valve and the locking rod engages the pivot arm to maintain the pressure relief valve in the open position.

7. The storage vessel of claim 6, wherein the base plate is bolted to the attachment plate.

8. A method for maintaining a relief valve coupled to a storage tank in an open position, wherein the relief valve includes a pivot arm having a first end and a second end, a weight attached to the pivot arm proximal the first end, and a lid coupled to the pivot arm proximal the first end, the method comprising:

(a) coupling a hand saver device to the relief valve with the relief valve in a closed position, wherein the hand saver device comprises:

a body comprising a base plate and a pair of extension arms extending upwardly from the base plate;

wherein the base plate has a central axis, a first end, a second end opposite the first end, a pair of lateral sides extending axially from the first end to the second end, and a recess extending axially from the first end;

wherein the extension arms are disposed on opposite lateral sides of the recess, and wherein each extension arm includes a throughbore;

an elongate locking rod configured to be removably disposed in the throughbores of the extension arms;

(b) raising the lid to transition the relief valve from the closed position to the open position and move the second end of the pivot arm downward through the recess of the base plate after (a); and (c) advancing the locking rod through the throughbores of the extension arms after (b) to prevent the second end of the pivot arm from rotating upward through the recess.

9. The method of claim 8, wherein (a) comprises fixably coupling the base plate of the hand save device to an annular attachment plate of the relief valve.

10. The method of claim 8, further comprising (d) removably coupling a fastener to an end of the locking rod after (c) to prevent the locking rod from being removed from the throughbores of the extension arms.

11. The method of claim 10, wherein the fastener comprises a locking pin.

12. The method of claim 8, further comprising (d) lowering the lid after (c) until the second end of the pivot arm directly engages the locking rod.

13. The method of claim 8, wherein the base plate comprises a pair of elongate, parallel plate-shaped members disposed on opposite lateral sides of the recess, and wherein the plate-shaped members are disposed on opposite sides of the pivot arm after (a).

14. The method of claim 13, wherein each of the plate-shaped members comprises a throughbore, and wherein (a) comprises bolting the base plate of the hand save device to an annular attachment plate of the relief valve using the throughbores of the plate-shaped members.

* * * * *